United States Patent [19]
Hoelmer

[11] 3,799,020
[45] Mar. 26, 1974

[54] SCRAP CHOPPER

[75] Inventor: Karl H. Hoelmer, Cincinnati, Ohio

[73] Assignee: The Tool Steel Gear & Pinion Co., Cincinnati, Ohio

[22] Filed: May 22, 1972

[21] Appl. No.: 255,693

[52] U.S. Cl. .................... 83/349, 83/356.3, 83/674, 83/923
[51] Int. Cl. ....................... B23d 25/02, B23d 25/14
[58] Field of Search .......... 83/349, 355, 356, 356.3, 83/923, 674, 673, 596

[56] References Cited
UNITED STATES PATENTS

| | | | |
|---|---|---|---|
| 2,814,345 | 11/1957 | Repper | 83/356.1 |
| 2,242,887 | 5/1941 | Holdgate et al. | 83/923 X |
| 2,682,996 | 7/1954 | Forman | 83/349 X |
| 3,291,174 | 12/1966 | Ward | 83/349 X |
| 3,401,585 | 9/1968 | Schmermund | 83/341 |
| 2,776,711 | 1/1957 | Bas | 83/355 X |

Primary Examiner—J. M. Meister
Attorney, Agent, or Firm—Wood, Herron & Evans

[57] ABSTRACT

A rotary scrap chopper for cutting scrap edge trimming from flat sheet metal strips. The chopper comprises a pair of knife carrying rotary arbors cooperable with a stationary knife to effect cutting of the edge trimmings into short pieces of scrap metal. The arbor knives are generally rectangular in cross section and have four cutting edges located on two cylindrical faces generated about a surface of revolution, the axis of which crosses the longitudinal axis of the knife. To facilitate a progressive cut, the knives are angulated relative to the axis of the arbor and the stationary knife. They are also supported on nonradial seats of the arbor so as to provide scrap clearance immediately behind the cutting edge. The stationary knife has a cutting edge defined by two surfaces which intersect at an included angle of approximately 105°.

12 Claims, 9 Drawing Figures

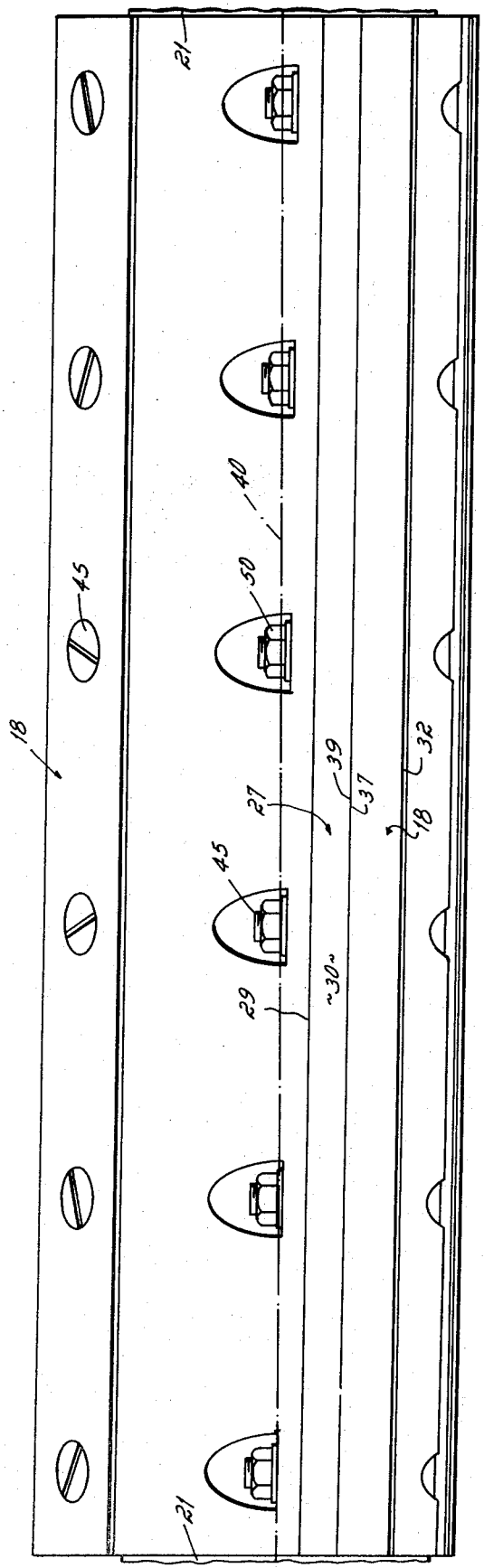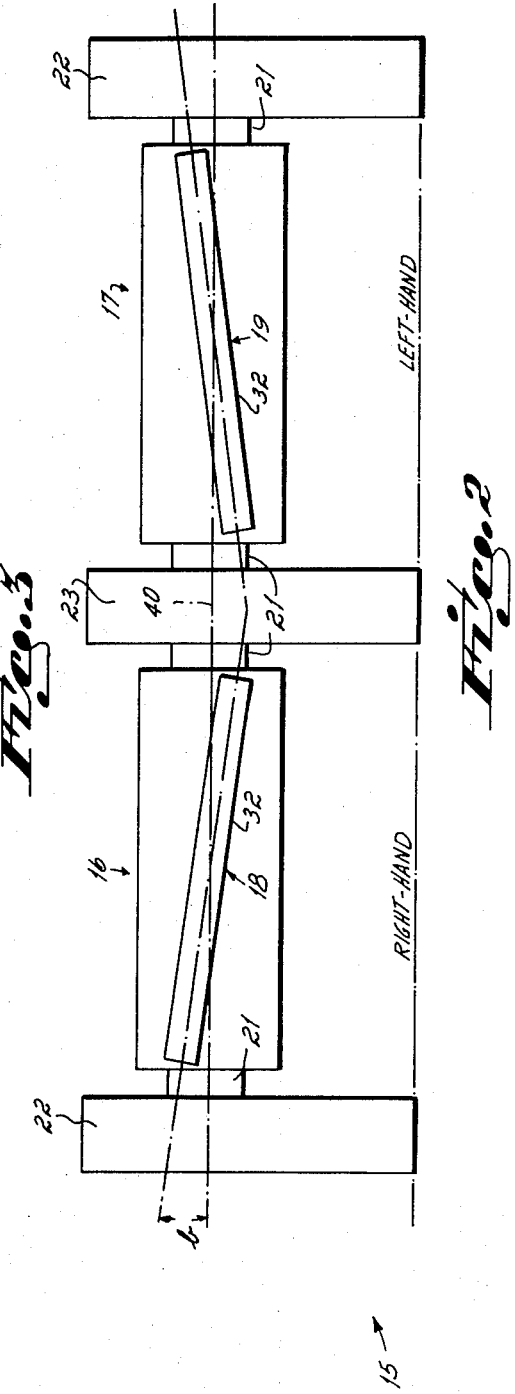

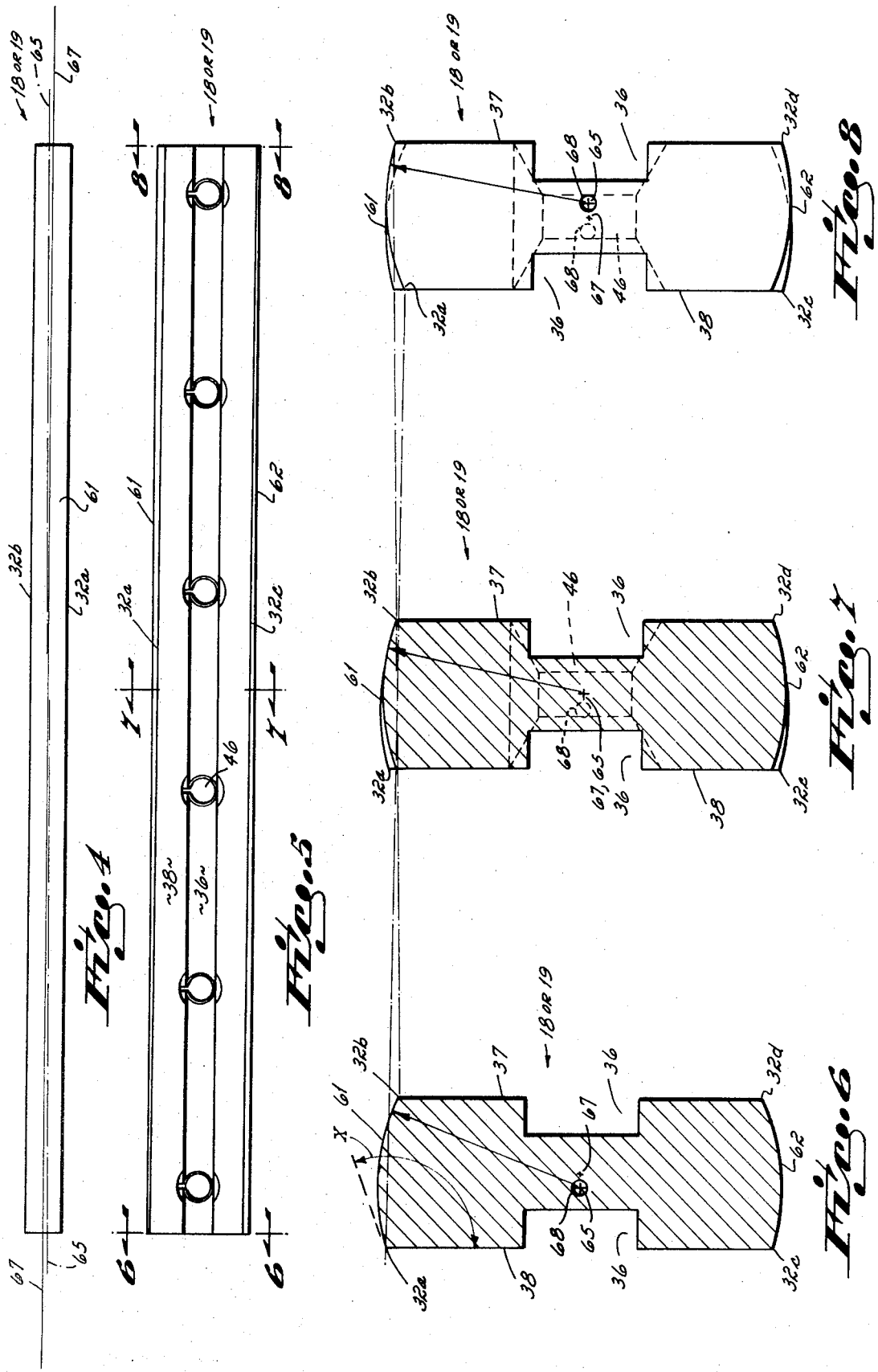

SCRAP CHOPPER

This invention realtes to rotary scrap cutters and Particularly to rotary cutters for cutting the side trimmings from a sheet of metal in a continuous rolling mill so as to enable those scrap cuttings to be handled without interference with the rolling operation.

In the course of manufacturing sheet metal, it is common to pass the sheet, after it has been finally sized, through edge trimmers which trim the opposite side edges of the sheet so as to provide it with an even edge and standard width. The side trimmings then come off the sheet as a long, continuous strip which is moved out of the plane of the continuously moving sheet, downwardly through scrap chutes into a chopper which cuts the long edge trimming strip into small manageable pieces, generally on the order of 4–6 inches in length.

In U. S. Pat. No. 2,814,345 issued Nov. 26, 1957 to Theodore A. Repper, there is disclosed a conventional scrap chopper for cutting the edge trimmings into small manageable pieces. That scrap chopper operates upon the principal of locating one or more cutter knives in radial planes of a rotating arbor. These knives rotate relative to a stationary cutter bar, the cutting edge of which is located closely adjacent to the edges of the rotating knives such that the edge trimming strip passes between the stationary cutter bar and the rotating knives and is chopped into small pieces. In that patent the rotary cutting knives are angulated upon the arbor relative to its axis and relative to the stationary cutter bar so that the cutting action occurs in the form of a progressive cut, starting at one end of the cutting edge and progressively executing a draw cut on the material as the rotary cutting edge continues its rotary movement.

In that scrap chopper, as in older scrap choppers which used a flat slicing action rather than a progressive cutting action to cut the edge trimming strip into small pieces, the metal manufacturers have always had a relatively poor knife life, generally on the order of 8–12 hours per edge on the knife with an operating line speed of about 900 feet per minute cutting scrap of about ⅛ inch in thickness. If the thickness of the metal increased, the knife life decreased proportionately; and similarly as the line speed increased, the knife life decreased proportionately. The metal manufacturing companies have perennially complained of this knife life and have attempted to obtain a longer one. However, until this invention the knife life described hereinabove has generally been about standard.

In addition to the problem of knife life, the metal manufacturing companies have always had trouble with the edge trimming strip "cobbling" in the scrap chutes. This term is used to describe the edge trimming taking on a wave form in the chute and then having the waves double over upon themselves and consequently jamming the chute of the scrap chopper.

It has therefore been one objective of this invention to provide an improved scrap chopper which increases the speed at which the edge trimming may be chopped into scrap pieces without cobbling of the edge trimming strip in the chutes.

Another objective of this invention has been to provide an improved scrap chopper which markedly increases the knife life, both of the stationary anvil mounted knife and the rotating knives.

In order to eliminate or minimize cobbling while at the same time increasing the speed at which the scrap chopper may cut scrap into small pieces, the scrap chopper of this invention incorporates a rotary knife which is mounted in a nonradial plane of the arbor so that there is a large clearance provided immediately behind the cutting edge of the arbor knife. To accomplish this angulation of the arbor knife while still maintaining a knife which is capable of a progressive draw type of cut on four different corners of the straight rectangular blade, the configuration of the blade has been markedly changed. Specifically, the grinding radius about which the corner edges of the arbor knives were generated was substantially reduced. This altered knife configuration considerably increases the wear life of the rotary knife by building up a substantial quantity of metal behind the cutting edges. A secondary advantage of this configuration is that it completely eliminates any need for a grinding fixture for grinding the rotary cutting knife because the blade may now be rotated about its own axis to generate the four cutting edges.

In order to enable the rotary cutting blade to be mounted at an angle to the longitudinal axis of the shaft about which it is rotated so as to effect a progressive cut between the rotary knife and the stationary knife, the axis of revolution about which the cutting edge surfaces are generated is angulated relative to the longitudinal axis of the knife such that the axis of revolution is located at one side of the longitudinal axis at one end of the knife and is located on the opposite side of the longitudinal axis at the other end. This orientation of the axis of rotation has the effect of generating two cylindrical faces on the knife. The cutting edges on one of those faces have a curvature which twists like a clockwise thread when viewed from the end while the cutting edges on the opposite face have a curvature which twists counterclockwise when so viewed. Consequently, the edges generated on one cylindrical face may be used on one of a pair of arbors while the edges on the other cylindrical face may be used on the other arbor so long as the angulation of the arbor seats on the two arbors slope in opposite directions or, expressed another way, define a V-shaped configuration between them.

The effect of this modification of the rotary arbor knives has been to substantially decrease the cost of machining the knives because there is now no need for a special fixture for the grinding operation. Additionally, this modification has markedly increased the knife life, generally by a factor of three to nine times from the old usual knife life of 8–12 hours under the conditions specified above to a knife life of 36–72 hours. Additionally, this modification has increased the speed at which a line may be operated with much less cobbling of the scrap in the chutes.

In addition to the increased rotary knife life, the invention of this application also incorporates a new stationary knife configuration which markedly increases the life of that anvil mounted knife. Specifically, the invention of this application incorporates a chamfer on each of the four corners of that knife. By chamfering each of the four corners, the cutting knife edge is defined by two intersecting surfaces which define between them an included angle of approximately 105°. This increased included angle has the effect of markedly increasing the life of the anvil mounted knife.

These and other objects and advantages of this invention will be more readily apparent from the following description of the drawings in which:

FIG. 2 is an end elevational view of the shaft mounted arbors of the scrap chopper of FIG. 1;

FIG. 3 is an end elevational view of one arbor of the scrap chopper, taken generally along line 3—3 of FIG. 1;

FIG. 4 is a top plan view of one of the rotary knives of the chopper of FIG. 1;

FIG. 5 is a side elevational view of the knife of FIG. 4;

FIG. 6 is a cross sectional view taken on line 6—6 of FIG. 5;

FIG. 7 is a cross sectional view taken on line 7—7 of FIG. 5;

FIG. 8 is a side elevational view taken on line 8—8 of FIG. 5; and

Figure 1:
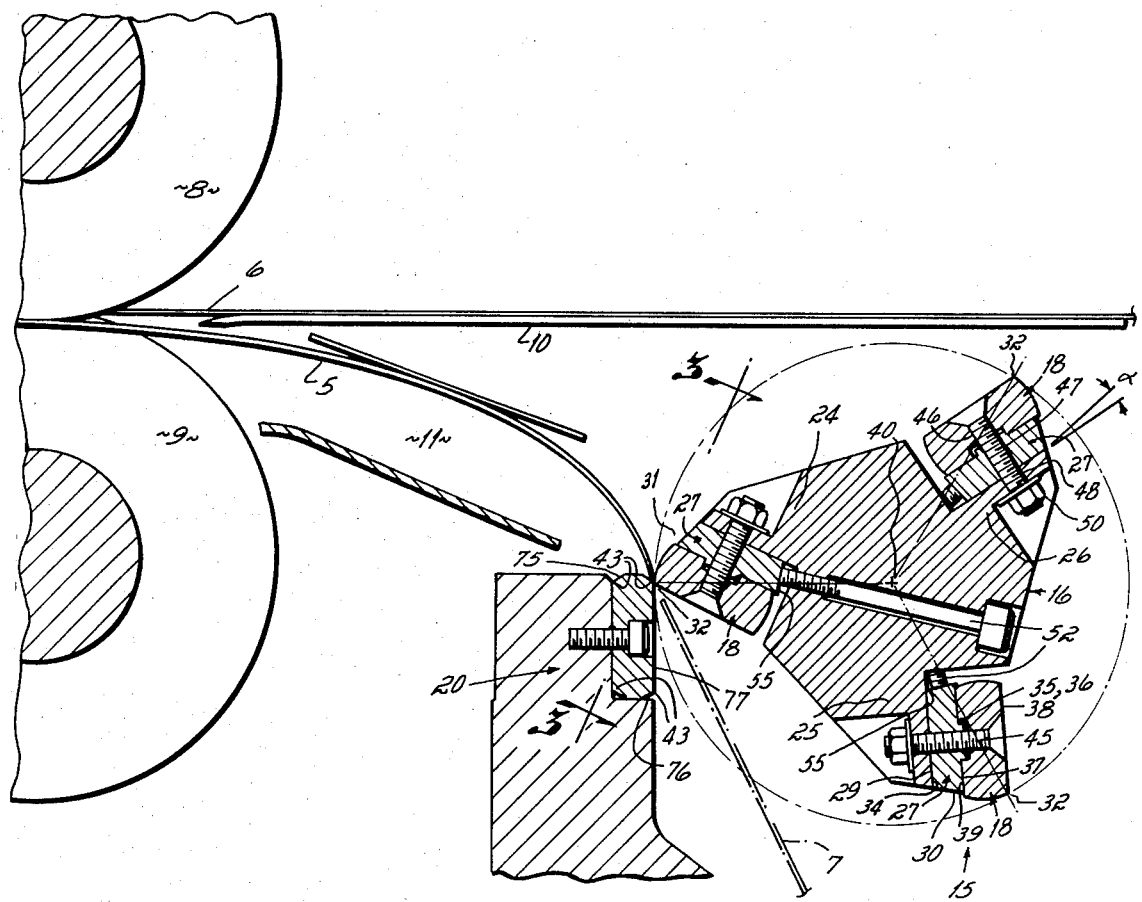
FIG. 1 is a partially diagrammatic cross sectional view of a sheet metal rolling line incorporating the invention of this application.

Referring to FIG. 1 first, there is shown the general assembly in which the present invention is applicable; namely, in the cutting of side trimming scrap strips 5 from continuous sheets of metal 6 into small segments or scraps 7 in order that the strips 5 does not interfere with the continuous feed of the sheet 6. Side cutting trimmer discs 8 and 9 are illustrated cutting the edges of sheet 6 while it continues to move over the table 10 toward the next processing or reeling station. The trimmed strips 5 are directed downwardly through scrap chutes 11 out of the path of the main sheet 6. The strips 5 are fed into the rotary scrap chopper 15 where they are cut into small pieces 7 for collection and removal.

The scrap chopper 15 comprises a pair of shaft mounted rotary arbors 16, 17 which carry knives 18, 19 and a stationary anvil mounted knife 20 for cutting the strips 5 into short lengths. The arbors 16, 17 are mounted upon a supporting shaft 21 which is in turn journalled in outboard bearing blocks 22, 22 and a central bearing block 23, the shaft being driven from a drive motor (not shown).

It is also common to reciprocate the shaft 16 during its rotation so as to effect cutting over differing portions of the blades 18, 19. The manner in which the shaft is reciprocated as well as the manner in which it is supported and driven form no part of the invention of this application and have therefore not been illustrated in detail.

Each of the arbors 16, 17 has three generally radially extending arms 24, 25 and 26, each one of which supports and carries an adjustment block 27 and the rotary knife or cutter bar 18, 19. The adjustment blocks are supported upon planar nonradial surfaces or seats 29 of the arbors, the outer edges or corners 30 of which intersect a radial plane through those corners at an angle $\alpha$ of approximately 10°. As is explained more fully hereinafter, this angulation of the seats 29 enables the rotary knives 18, 19 to be angulated so as to provide a large clearance 31 immediately behind the cutting edge 32 of each knife.

Each adjustment block 27 has a planar surface 34 slideable over the surface 29 of the arbor. The opposite side of the block is generally parallel to the planar surface 34 except that it has an upstanding ridge or key 35 adapted to receive a groove or channel 36 which is in each of the generally planar side wall surface 37, 38 of the rotary knives.

Referring now to FIGS. 2 and 3, it will be seen that the adjustment block seating surface 29 as well as the knife seating surface 39 of the adjustment block are angulated relative to the collinear axes 40 of the arbors 16 and 17 and the shaft 21. The slope of these surfaces relative to the arbor axes in one preferred embodiment of the invention is approximately 0.0134 inch of taper per linear inch of arbor. This taper is sufficient to enable the cutting edge 32 of the knife to cooperate with a cutting edge 43 of the stationary knife 20 which is parallel to the axis 40 and effect a progressive or draw type of cut between the two. This cut is much the same as that effected by a reel of a reel type lawn mower.

The three rotary knives are each secured onto the arms 24-26 of the arbor by a plurality of bolts 45 which pass through countersunk holes 46 in the knives 18, 19 and aligned holes 47, 48 in the adjustment blocks 27 and arms 24-26, respectively. While the nuts 50 on the bolts 45 are still loose, adjustment screws 52 which are threaded through the arbors and into engagement with edge surface 55 of the adjustment block are rotated so as to effect precise positioning of the rotary knife cutting edges 32 relative to the stationary blade cutting edge 43 after which the nuts 50 are tightened so as to secure the knives 18, 19 in an adjusted position. The provision of the adjustment blocks minimizes the criticality of machining tolerances on the arbor and the knife and therefore substantially reduces the cost of manufacturing these components.

Referring now to FIGS. 4-8, there is illustrated a preferred embodiment of a rotary knife. This knife has two flat sides 37, 38 midially of each of which there is the keyway slot or groove 36 which is cooperable with the key 35 of an adjustment block to hold the knife in an adjusted position. The other two sides 61, 62 of the generally rectangular blade have surfaces which are configurated as sections of a cylinder generated about an axis 65. As may be seen most clearly in FIG. 8, this axis of generation 65 of the surfaces 61, 62 is angulated relative to the longitudinal center line 67 of the knife. The two axes 65, 67 cross midway of the length of the bar.

The surfaces 61, 62 are generated about the axis 65 while the knife is rotated on this axis and supported in center holes 68 located in the opposite ends of the blade. Because the axis of rotation is angulated relative to the longitudinal axis of the blade, the two cylindrical surfaces 61, 62 are nonsymmetrical except at the longitudinal center of the blade where the two axes 65, 67 cross. Each knife 28 has a pair of left hand as well as a pair of right hand cutting edges. That is to say, one side or two edges 32a, 32b of the knife are right handed and can only be used on the right hand arbor (see FIG. 2) while the other two edges 32c, 32d are left handed and must be used on the left hand arbor.

As may be seen most clearly in FIG. 2, the rake angle $b$ of the two arbors 16 and 17 is identical but the two are of opposite hand. That is, they both slope inwardly toward the center forming a relatively flat V. The hand of the arbor is determined in the same way that the thread of a screw is determined. When viewed from the end, the knife edge seat 39 is considered as the thread of a screw and either slopes in a direction to be left handed or right handed. In use, when an edge, as for example, edge 32a of the knife, becomes worn, the knife may be rotated end for end to place a new edge, as for example, 32b, in position for cutting. If both right hand edges are worn, a knife from the right hand arbor 16 is exchanged for the knife of the left hand arbor 17 and the knife is turned about its center to bring one of the left hand edges 32c, 32d into the cutting position. In this way all four edges of the knife may be used before regrinding is required.

Now referring to FIG. 1, it will be seen that because the plane of the adjustment block seat 29 and of the parallel knife seat 39 are located out of the radial plane of the arbor and in a plane which intersects at an acute angle α a radial plane which passes through the outer edge of the seat 29, the generally rectangular blade 18, 19 is sharply angulated relative to a radial plane which passes through it. Consequently, there is a large clearance 31 immediately behind the cutting edge 32 of the blade. This clearance enables a trimming strip 5 to start to move forwardly into that clearance 31 as soon as the cut is made by the preceding edge. In the absence of this angular mounting of the blade 18, 19 (or expressed another way, if the blade were mounted in a radial plane on the radial surface) the strip 5 would have to await the passing of the cylindrical surface 61 of the blade before it could move forwardly into the clearance area 70 provided by the cut-away section of the arms 24-26. This angulation of the blade therefore minimizes cobbling of the strip 5 in the chute 11 and consequently enables the speed of the sheet 6 to be substantially increased without interference from a cobbled edge trimming strip 5.

Additionally, this orientation of the blade enables its cutting edges and cylindrical faces to be ground on a radius which is substantially shorter than the radius of the arbor. Consequently, each of the cutting edges is a heavy edge defined by two surfaces which intersect at an included angle substantially greater than 90°. In other words, the included angle X between a line which is tangent to the surface 61 or 62 at the cutting edges 32a, 32b, 32c, and 32d and the side faces 37, 38 is substantially greater than 90° and in the preferred embodiment is approximately 110°. The heavy edge thus provided on the blade markedly increases the tool life or the useful life of a cutting edge before it needs to be reground.

Similarly, the useful cutting life of the blade 20 may be markedly increased by chamfering each of its four cutting edges as indicated at 75. As a significance of this chamfering of the cutting edges, the included angle between the two surfaces 76, 77 which define each of the cutting edges 43 is greater than 90°. Again, this heavy edge has a much longer life than the conventional 90° included angle edge now commonly used on the stationary anvil blade 20.

Figure 9:
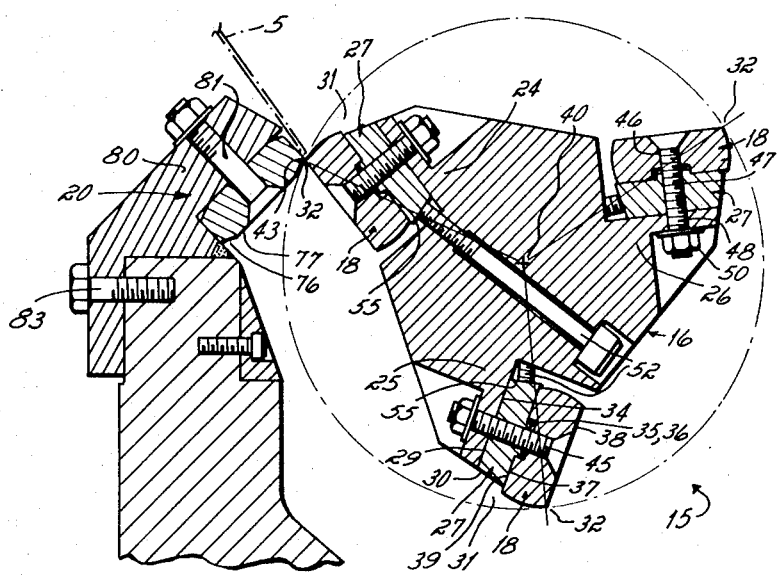
FIG. 9 is a view similar to FIG. 1 but illustrating a modified anvil and knife.

Referring now to FIG. 9, there is illustrated another preferred embodiment of anvil cutting blade 20. In this embodiment the anvil 20 is secured onto a riser block 80 by a bolt 81. The riser block in turn is secured onto the anvil by a bolt 83. In all other respects the embodiment of FIG. 9 is identical to the embodiment of the scrap chopper 15. In this embodiment as in the first embodiment, the knife 20 has its cutting edge 43 parallel to the axis of rotation 40 of the shaft 20 and the arbors 16, 17. However, the cutting edge is raised substantially above the horizontal plane of that axis 40 so that the strip of scrap 5 enters between the two cutting edges 43, 32 at much less of an angle than it does in the embodiment of FIG. 1. This reduction of angle of entry of the scrap strip 5 to between the cutting edges has the effect of increasing tool life.

While we have described only two embodiments of our preferred scrap chopper, persons skilled in the art to which this invention pertains will readily appreciate modifications and changes which may be made without departing from the spirit of the invention. Therefore, we do not intend to be limited except by the scope of the following appended claims.

Having described our invention, we claim:

1. A rotary sheetmetal scrap cutter comprising, a rotary shaft extending transversely to the direction of feed of the sheetmetal and embodying a plurality of arms extending equidistantly and radially therefrom, a generally planar seat on each side of said arms extending angularly relative to the longitudinal axis of said shaft, said seat being located out of a radial plane of said shaft and intersecting at an acute angle a radial plane which extends through the outer edge of said seat, a first straight cutter bar detachably mounted on each seat, said cutter bar being of substantially rectangular cross section and having opposed faces, each of said faces forming a portion of a cylinder, and being generated about a surface of revolution, the axis of which extends through said cutter bar, said cutter bar having four cutting edges along its four corners to provide selectively one cutting edge remote from said seat, the outermost cutting edge of said cutter bar forming part of a common surface of revolution to produce a cutting edge section which is unsymmetrical with respect to the inoperative cutting edge at the opposite corner of said cutter bar except at the midportion thereof, the outermost face of said cutter bar sloping away from said surface of revolution at said cutting edge to provide clearance for scrap behind said cutting edge, a stationary anvil adjacent to said rotary shaft, and a second cutter bar detachably mounted on said anvil and provided with a cutting edge which is parallel to the axis of said rotary shaft and in position for coaction with said one cutting edge of said first cutter bar, the angularity between the edges of said cutter bars resulting in a progressive cut on a sheet of material fed between the rotary shaft and stationary anvil.

2. The rotary sheet metal scrap cutter of claim 1 in which the axis of said first cutter bar surface of revolution is located on one side of said cutter bar's longitudinal axis at one end of said bar and on the opposite side of said cutter bar longitudinal axis at the other end of said cutter bar.

3. A rotary sheetmetal scrap cutter comprising a rotary shaft extending transversely to the direction of feed of the sheetmetal and embodying a plurality of arms extending equidistantly and radially therefrom, a generally planar seat on each of said arms, said seat being located out of a radial plane of said shaft and intersecting at an acute angle a radial plane which extends through the outer edge of said seat, straight first cutter bars detachably mounted on each seat, said first cutter bars being of substantially rectangular cross section and having opposed faces, each of said faces forming a portion of a cylinder, said faces being generated about a surface of revolution the axis of which extends through the longitudinal axis of said cutter bar, each of said cutter bars having four cutting edges along its four corners to provide selectively one cutting edge remote from said seat, the outermost cutting edge of said cutter bar forming part of a common surface of revolution, the axis of which coincides with the axis of said shaft, the outermost face of said cutter bar sloping away from said surface of revolution at said cutting edge to provide clearance for scrap behind said cutting edge, a stationary anvil adjacent to said rotary shaft, and a second cutter bar detachably mounted on said anvil and provided with a cutting edge which is in position for co-action with said one cutting edge of said first cutter bars.

4. The rotary scrap chopper of claim 3 in which said cutting edge of said second cutting bar is defined by the intersection of two surfaces of said second cutting bar, said intersection defining an included angle greater than 95°.

5. A rotary sheet metal scrap cutter comprising a rotary shaft extending transversely to the direction of feed of the sheet metal and embodying a plurality of arms extending equidistantly and radially therefrom, a generally planar seat on each of said arms, a straight cutter bar detachably mounted on each seat, said cutter bar being of substantially rectangular cross section and having four cutting edges along its four corners to provide selectively one cutting edge remote from said seat, the outermost cutting edge of said cutter bar forming part of a common surface of revolution to produce a cutting edge section, a stationary anvil adjacent to said rotary shaft, and a second cutter bar detachably mounted on said anvil and provided with a cutting edge which is parallel to the axis of said rotary shaft and in position for co-action with said one cutting edge of said first cutting bar, said cutting edge of said second cutting bar being defined by the intersection of two surfaces of said second cutting bar, said intersection defining an included angle greater than 95°.

6. A rotary sheetmetal scrap cutter comprising a rotary shaft extending transversely to the direction of feed of the sheetmetal and embodying a pair of spaced arbors, each of said arbors having a plurality of arms extending equidistantly and radially therefrom, a generally planar seat on each of said arms extending angularly relative to the longitudinal axis of said shaft, the angularity of the seats of said two arbors being in opposite directions so that two opposed seats on said arbors define a V, each of said seats being located out of a radial plane of said shaft and intersecting at an acute angle a radial plane which extends through the outer edge of said seat, a straight first cutter bar detachably mounted on each seat, said cutter bar being of substantially rectangular cross section and having opposed faces, each of said faces forming a portion of a cylinder, and being generated about a surface of revolution, the axis of which extends through the longitudinal axis of said cutter bar, said cutter bar having four cutting edges along its four corners, two of said cutting edges being defined by one of said portions of a cylinder and being so configurated that they form part of a common surface of revolution about the axis on only one of said arbors, the other two of said cutting edges being defined by the other portion of a cylinder and being so configurated that they form part of a common surface of revolution about the axis on only the other one of said arbors, the outermost face of said cutter bar when mounted upon said seat sloping away from said surface of revolution at said cutting edge to provide clearance for scrap behind said cutting edge, a stationary anvil adjacent to said rotary shaft, and a second cutter bar detachably mounted on said anvil and provided with a cutting edge which is parallel to the axis of said rotary shaft and in position for co-action with said one cutting edge of said first cutter bars, the angularity between the edges of said cutter bars resulting in a progressive cut on a sheet of material fed between the rotary shaft and stationary anvil.

7. The rotary sheet metal scrap cutter of claim 6 in which the axis of said first cutter bar surface of revolution is located on one side of said cutter bar longitudinal axis at one end of said bar and on the opposite side of said cutter bar longitudinal axis at the other end of said bar.

8. A cutter bar for use in a rotary sheet metal scrap cutter which comprises a rotary shaft extending transversely to the direction of feed of the sheet metal and embodies a plurality of arms extending equidistantly and radially therefrom, a generally planar seat on each of said arms extending angularly relative to the longitudinal axis of said shaft, said seat being located out of a radial plane of said shaft and intersecting at an acute angle a radial plane which extends through the outer edge of said seat, said cutter bar being adapted to be detachably mounted on one of said seats, said cutter bar being of substantially rectangular cross section and having opposed faces forming part of a first common surface of revolution generated about a first axis of revolution, said cutter bar having four cutting edges along its four corners to provide selectively one operative cutting edge located remote from said seat when said cutter bar is secured to said seat, the outermost cutting edge of said cutter bar when secured to said seat forming part of a second surface of revolution generated about a second axis of revolution, said first surface of revolution being substantially shorter in radius than said second surface of revolution, the outermost face of said cutter bar when said bar is secured to said seat being adapted to slope away from said second surface of revolution at said cutting edge to provide substantial clearance for scrap behind said cutting edge.

9. The cutter bar of claim 8 in which said faces of said cutter bar are generated about the surface of revolution, the axis of which extends through the longitudinal axis of said cutter bar.

10. The cutter bar of claim 9 in which the axis of said cutter bar surface of revolution is located on one side of said cutter bar longitudinal axis at one end of said bar and on the opposite side of said cutter bar longitudinal axis at the other end of said bar.

11. A cutter bar for use in a rotary sheet metal scrap cutter which comprises a rotary shaft extending transversely to the direction of feed of the sheet metal and embodies a plurality of arms extending equidistantly and radially therefrom, a generally planar seat on each of said arms, said seat being located out of a radial plane of said shaft and intersecting at an acute angle a radial plane which extends through the outer edge of said seat, said cutter bar being adapted to be detachably mounted on said seat, said cutter bar being of substantially rectangular cross section and having opposed faces, said faces being generated about an axis of revolution which extends through the longitudinal axis of said cutter bar, said cutter bar having four cutting edges along its four corners to provide four selectively useable cutting edges.

12. The cutter bar of claim 11 in which the axis of revolution of said faces is located on one side of said cutter bar longitudinal axis at one end of said bar and on the opposite side of said cutter bar longitudinal axis at the other end of said bar.

* * * * *